June 18, 1968 W. H. SHAW 3,389,224
CONFERENCE CONNECTION AND CONTROL DEVICE FOR
TELEPHONE SUBSCRIBER LINES
Filed March 5, 1965
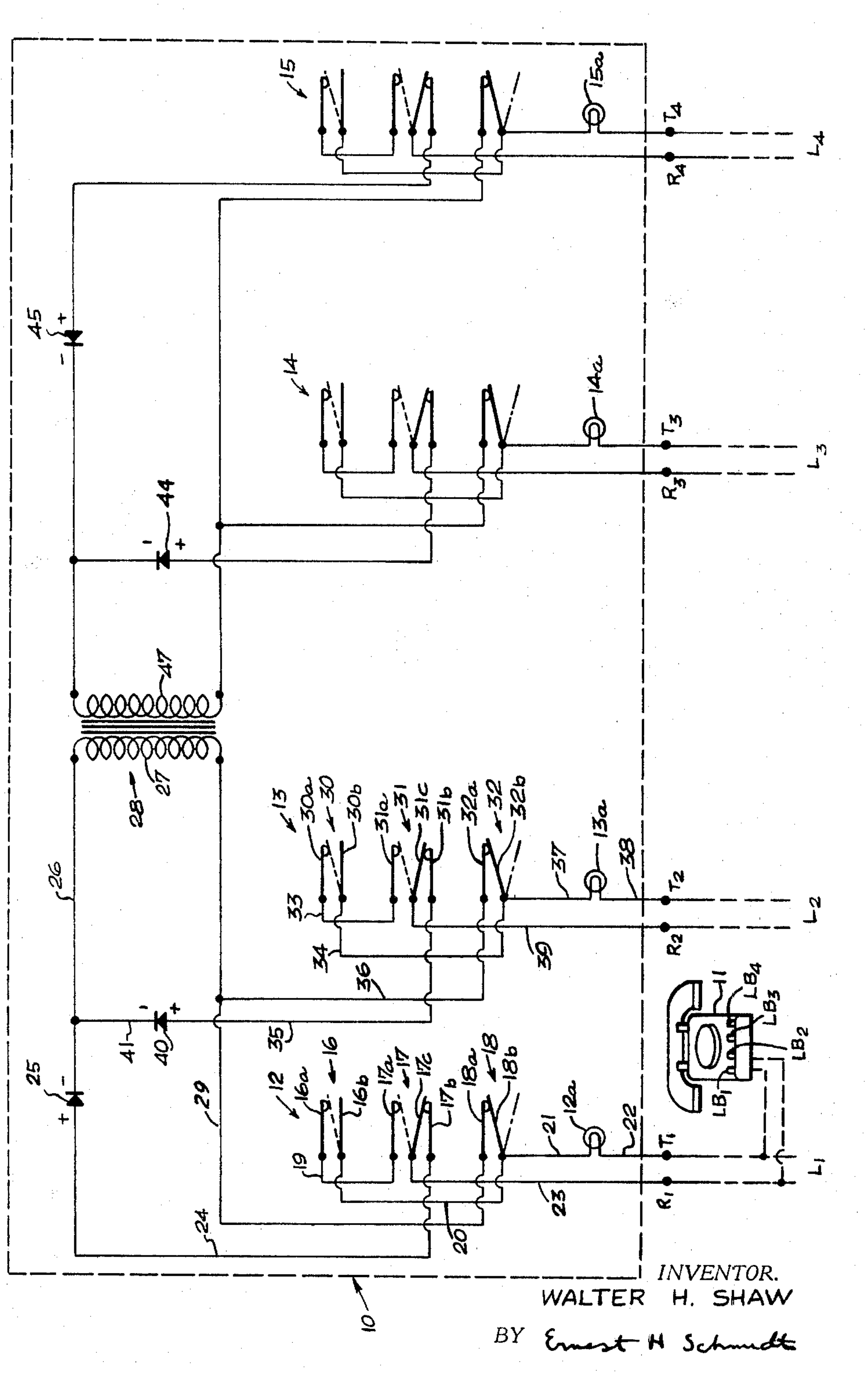
INVENTOR.
WALTER H. SHAW
BY Ernest H Schmidt
ATTORNEY.

United States Patent Office 3,389,224

Patented June 18, 1968

3,389,224

CONFERENCE CONNECTION AND CONTROL DEVICE FOR TELEPHONE SUBSCRIBER LINES

Walter H. Shaw, Miami, Fla., assignor to Shaw Electronics Incorporated, a corporation of Florida Filed Mar. 5, 1965, Ser. No. 437,443
4 Claims. (Cl. 179—1)

ABSTRACT OF THE DISCLOSURE

The invention consists of a conference connection and control device for telephone subscriber lines whereupon a controlling subscriber having a plurality of subscriber lines terminating at his set may interconnect these subscriber lines to form a conference circuit. The conference and control circuit consists of a pair of subscriber lines, that are terminated at the control subscribers set and under control of line button keys at the set, connected in parallel across the primary of a transformer and another pair of subscriber lines connected in parallel across the secondary. Each subscriber line is connected into the circuit and is under the control of a three position toggle switch. The switch has a "talk," "hold" and "disconnect" position. In the "hold" position, an indicator lamp approximately equal in impedance to a subscriber set is switched into the conference circuit. The control subscriber brings the other subscribers into the conference circuit individually and manually. The line button keys of the set connect the control subscriber to the various outgoing lines and the three position toggle switches hold the subscriber lines connected while the control subscriber is dialing out on another line.

My invention relates to telephone conference control circuitry and is directed particularly to a device for controlling conference connection with and among a plurality of remote telephone subscribers at a subscriber station having a plurality of telephone circuit subscriber lines.

The principal object of my invention is to provide a conference control device of the character above described that enables a subscriber at the controlling station to make successive outgoing cells to persons at a plurality of mutually remote stations to bring them into conference connection with him and with any or all of the other remote stations, selectively, and to selectively hold and disconnect each of the remote lines at will, whereby complete control of the telephone conference connection with respect to calling, holding, interconnecting for conference and disconnecting each of the individual remote stations called is maintained at the controlling station.

A more particular object is to provide a conference control device of the above nature which enables the controlling subscriber to place the plurality of calls to be brought into conference in the normal manner through local and/or toll lines of a telephone system over a like number of individual subsciber lines at the controlling subscriber station, whereby each line can be controlled individually as to when it is brought into and dropped out of the conference connection for most economical use of toll line facilities of the telephone system.

Still another object is to provide a conference control device of the above nature wherein the status of each of the remote stations called into conference is controlled by an individual toggle switch having "talk," "hold" and "release" positions, each position of which is indicated or monitored by a single supervisory lamp, which lamp, in addition, serves as a terminal line impedance when its associated subscriber line is at "hold" position.

Yet another object is to provide a conference control device that is compact, simple to install and operate, and dependable and durable in use.

Other objects, features and advantages of the invention will be apparent from the following description when read with reference to the accompanying drawing, the single figure of which illustrates, schematically, the circuitry of a conference connection and control device embodying the invention.

Referring now in detail to the drawing, the broken line box indicated at 10 encompasses the internal circuitry, shown schematically, of my device, the same having a plurality (four in the embodiment illustrated) of ring and tip line pairs R1, T1; R2, T2; R3, T3 and R4, T4, respectively, externally connected, correspondingly, to the ring and tip leads of telephone subscriber lines L1, L2, L3 and L4 available for conference connection at the controlling subscriber station. A telephone subscriber handset 11 associated with individual subscriber lines L1, L2, L3 and L4 and connectable individually and selectively thereto under the control of line button keys LB1, LB2, LB3 and LB4 as in an ordinary multiple-line subscriber service installation is used to make the outgoing calls to and for conferring with the remote stations in the manner hereinafter described. Toggle switches 12, 13, 14 and 15 control the individual lines L1, L2, L3 and L4, with respect to their "talk," "hold" and "release" status, as is hereinbelow described.

Toggle switch 12 comprises a normally open, single-pole, single-throw switch 16 having fixed contact arm *16a* and movable contact arm *16b*; a single-pole, double-throw switch 17 comprising fixed contact arms *17a* and *17b* and movable contact arm *17c* normally in contact with fixed contact arm *17b*; and a normally closed single-pole, single-throw switch 18 comprising fixed contact arm *18a* and movable contact arm *18b*. Fixed switch contact arm *16a* is connected, as by conductor 19, to fixed contact arm *17a*. Movable contact arm *16b* is connected, as by conductor 20, to movable contact arm *18b* and thence, as by conductor 21, to one terminal of a supervisory lamp *12a* associated with switch 12. The remaining terminal of the supervisory lamp *12a* is connected, as through lead 22, to line tip terminal T1. The movable contact arm *17c* associated with switch 17 is connected, as through lead 23, to line ring terminal R1. The fixed contact arm *17b* associated with switch 17 is connected, as by conductor 24, to the positive (+) terminal of a diode rectifier 25, the negative (−) terminal of which is connected, as by conductor 26, to one terminal of a winding 27 of a two-winding, one-to-one ratio repeat transformer 28. The other terminal of the winding 27 is connnected, as by conductor 29, to the fixed contact arm *18a* associated with switch 18.

Toggle switch 13 is similar to switch 12 associated with line L1 and comprises a normally open single-pole, single-throw switch 30 having fixed contact arm *30a* and movable contact arm *30b*; a single-pole, double-throw switch 31 comprising fixed contact arms *31a* and *31b*, and movable contact arm *31c* normally in contact with fixed contact arm *31b*; and normally closed single-pole, single-throw switch 32 comprising fixed contact arm *32a* and movable contact arm *32b*. Fxed contact arm *30a* is connected to fixed contact arm *31a* as by conductor 33. Movable contact arm *30b* is connected to fixed contact arm *32a* as by conductor 34. Fixed contact arm *31b* is connected through conductor 35 to the positive (+) terminal of a diode rectifier 40 the negative (−) terminal of which is connected, as by conductor 41, to conductor 26 leading to transformer winding 28. Movable contact arm *31c* is connected, as by conductor 39, to line ring terminal R2. Movable contact arm *32b* is connected, as by conductor 37, to one terminal of a supervisory lamp *13a*, the other terminal of which connects to tip terminal T2 through conductor 38.

The three position toggle switches 14 and 15 are identical with switches 12 and 13 and are connected by identical circuitry, including diode rectifiers 44 and 45, to the other winding 47 of repeat transformer 28 to provide conference connection to the two additional subscriber lines L3 and L4 through ring and tip terminal pairs R3, T3 and R4, T4.

In the use of my conference connection and control device, telephone 11 will be employed in ordinary fashion to make a call to the first remote station to be called into conference, through line L1, for example, as illustrated by the broken-line representation of connection with said line effected by pushing down the corresponding line button key LB1 of said telephone. The switch 12, being at "talk" position, as illustrated by the full-line representation of its associated switch arms, establishes a circuit from the tip lead of line L1 through conductor 22, lamp 12*a*, conductor 21, closed switch 18*a*, 18*b*, and conductor 29 to one terminal of the winding 27 comprising repeat transformer 28, thence, from the other terminal of said transformer, through conductor 26 to the negative terminal of the diode 25, and thence, from the positive terminal of said diode, through conductor 24, closed switch 17*b*, 17*c*, and conductor 23 to the ring lead of line L1. Since positive polarity appears at the ring terminal and negative at the tip terminal in a normal telephone line before its connection in a talking circuit, the diode 25 at this point blocks the flow of line current through the repeat transformer 27 in the just described circuit. However, the called person, in picking up the handset at the remote called station, will effect polarity reversal in the now established first talking circuit in accordance with standard telephone circuitry operation, so that a direct current path is established through the diode 25, the repeat transformer 27, and the supervisory lamp 12*a*. The lamp 12*a* will thus light, being energized by the direct current in the talking circuit line. Preferably, the toggle switch 12 is of the type incorporating the indicator lamp 12*a* and having colored lenses controlled by switch lever position to indicate switch position by luminous color code. Thus the lamp 12*a* will not only light, but will shine through a lens of a particular color, green for example, indicating that a talking circuit has been established to the first remote station called into conference. The switch 12 will then be placed in the "hold" position, as illustrated by the dotted line representation of its associated switch arms 16 and 17 to place the supervisory lamp 12*a* directly across the line L1 from tip terminal T1, through conductor 22 to one terminal of said lamp, thence, from the other terminal of said lamp, through conductor 21, closed switch 18*a*, 18*b*, conductor 20, now closed switch 16*a*, 16*b*, conductor 19, now closed switch 17*a*, 17*c*, and conductor 23 to ring terminal R1. The lamp 12 thus serves as a terminal impedance for line L1 to maintain connection with the first called remote station. In the "hold" position of the switch, the lamp could shine through a red lens, for example, controlled by switch position as described above.

The telephone 11 will then be connected to line L2, by pressing down key button LB2 so that an outgoing call can be made in the usual way to the second remote station to be called into conference. As described above in connection with the circuit associated with switch 12, in making the second outgoing call the switch 13 will be placed in "talk" position, as illustrated by the full-line position of the associated switch arms, the diode 40 preventing flow of current until the second person called into conference picks up his handset, at which time line polarity reverses to place the winding 27 of the repeat transformer 28 in connection across the line L2 in series with the supervisory lamp 13*a*. The lamp will thus be energized and shine through a green lens, for example, signifying that the switch is in "talk" position. At this point, the switch 12 associated with line L1 can be placed in "talk" position again, assuming it had been placed in "hold" position, enabling the first two remote parties brought into conference to talk together while the controlling subscriber makes additional outgoing calls through his lines L3 and L4. As soon as a talking circuit is established for each new remote subscriber brought into conference, he can talk with those already brought into conference provided their associated switches 12, 13, etc. at the controlling station are in "talk" position. While only four talking circuits for four lines are shown, additional windings on the repeat transformer 28 could be provided for adding identical line control circuitry, preferably in line pairs for each additional winding, as illustrated. The controlling subscriber will be able to talk in conference no matter in which line he happens to be connected, provided its associated switch is in "talk" position. The controlling subscriber can disconnect any established talking circuit simply by placing the associated switch in disconnect or "release" position, the position represented by the open dash-dot line position of switch arm 18*b* associated with toggle switch 12, for example. In this switch position, the above-described talking circuit through normally closed switch 18 to repeat coil 28 is opened, disconnecting associated line L1 from conference connection. The controlling subscriber can still talk, privately, if desired, with the remote station connected to line L1 provided his telephone set 11 is connected across the line, as illustrated in the drawing. As soon as the controlling subscriber replaces the handset, or switches to one of the other remote station lines, line L1 will be disconnected. Thus it will be apparent that the controlling subscriber has complete control as to who is brought into conference, which of those brought in are in "talking" or "hold" status at any particular time, which are conferred with privately at any time, and which are released or disconnected at any time. It will also be understood that the number of remote stations brought into conference is limited only by the number of individual subscriber lines available at the controlling station.

While I have illustrated and described herein only one form in which my invention can conveniently be embodied in practice, it is to be understood that this form is presented by way of example only, and not in a limiting sense. My invention, in brief, comprises all the modifications and embodiments coming within the scope and spirit of the following claims.

What I claim as new and desire to secure by Letters Patent is:

1. A conference connection and control device for telephone subscriber lines comprising, in combination, a repeat coil, a plurality of tip and ring terminal pairs for connection, one pair each, to a like plurality of subscriber lines at the controlling subscriber station, an electrical circuit interconnecting each of said tip and ring terminal pairs with said repeat coil, for transmitting voice frequency electrical currents therebetween, a rectifier in each of said circuits series-connected with said repeat coil, a supervisory lamp in each of said circuits, series-connected with its associated tip terminal, a three position switch means in each of said circuits and having "talk," "hold" and "release" positions, said switch when in said "talk" position being operative to connect its associated tip and ring terminal pair across said repeat coil through its associated supervisory lamp and rectifier, said switch when in said "hold" position being operative to connect its associated lamp directly across its associated tip and ring terminals, and said switch when in said "release" position being operative to open-circuit its associated circuit at its supervisory lamp.

2. A conference connecton and control device for telephone subscriber lines as defined in claim 1 wherein the polarity of connection of said rectifier is such as to block the flow of current to said repeat coil until line polarity of a subscriber line connected to the associated tip and ring terminal pair is reversed by the answering of a remote subscriber station called over said subscriber line.

3. A conference connection and control device for telephone subscriber lines as defined in claim 2 wherein the electrical characteristics of said supervisory lamp are such as to be energized to incandescence by standard subscriber line potential and at the same time serve as a terminal impedance for holding the telephone line when shunted directly thereacross.

4. A conference connection and control device for telephone subscriber lines as defined in claim 2 wherein said repeat coil comprises a plurality of separate windings, two of said circuit means being connected to one of said windings.

References Cited

UNITED STATES PATENTS 3,331,924 7/1967 Reaves ............... 179—1

KATHLEEN H. CLAFFY, *Primary Examiner.*

A. H. GESS, *Assistant Examiner.*